(12) United States Patent
Kiedaisch et al.

(10) Patent No.: US 6,309,140 B1
(45) Date of Patent: Oct. 30, 2001

(54) FENDER SYSTEM

(75) Inventors: Edward Kiedaisch; Michael J. Grimsley; Thaddeus J. Kiedaisch, all of Keokuk, IA (US)

(73) Assignee: Svedala Industries, Inc., Waukesha, WI (US)

(*) Notice: Subject to any disclaimer, the term of this patent is extended or adjusted under 35 U.S.C. 154(b) by 0 days.

(21) Appl. No.: 09/407,508

(22) Filed: Sep. 28, 1999

(51) Int. Cl.$^7$ ..................................................... E02B 3/26
(52) U.S. Cl. ........................... 405/215; 405/212; 405/84; 114/219; 14/76; 267/140
(58) Field of Search ................................. 405/215, 212, 405/213, 214, 84, 85; 114/219, 220; 14/76; 267/140, 139

(56) References Cited

U.S. PATENT DOCUMENTS

| | | | |
|---|---|---|---|
| 1,158,295 | * 10/1915 | Rodriguez | 405/85 |
| 1,530,394 | * 3/1925 | Muller | 405/85 |
| 1,605,888 | * 1/1926 | Beaubien et al. | 405/85 |
| 3,507,123 | 4/1970 | Miura . | |
| 3,600,869 | 8/1971 | Petroff . | |
| 3,788,082 | * 1/1974 | Narabu | 405/215 |
| 3,948,500 | * 4/1976 | Korbuly et al. | 405/215 |
| 4,073,482 | 2/1978 | Seegmiller et al. . | |
| 4,186,913 | 2/1980 | Bruner et al. . | |
| 4,285,616 | * 8/1981 | Evetts | 405/215 |
| 4,289,419 | 9/1981 | Young et al. . | |
| 4,319,539 | * 3/1982 | Fujii et al. | 405/215 |
| 4,399,980 | 8/1983 | Van Schie . | |
| 4,452,431 | 6/1984 | Stephens et al. . | |
| 4,497,593 | 2/1985 | Kramer . | |
| 4,548,151 | 10/1985 | Files et al. . | |
| 4,554,882 | * 11/1985 | Lemmens | 405/215 |
| 4,583,716 | 4/1986 | Stephens et al. . | |
| 4,674,911 | 6/1987 | Gertz . | |
| 4,733,992 | 3/1988 | Dehlen . | |
| 4,844,213 | 7/1989 | Travis . | |
| 4,848,969 | 7/1989 | Murota et al. . | |
| 4,909,661 | 3/1990 | Ivey . | |
| 5,097,785 | 3/1992 | Zidek . | |
| 5,174,221 | 12/1992 | Enami et al. . | |
| 5,199,755 | 4/1993 | Gertz . | |
| 5,248,129 | 9/1993 | Gertz . | |
| 5,361,715 | 11/1994 | Kiedaisch et al. . | |
| 5,642,792 | 7/1997 | June . | |
| 5,645,368 | 7/1997 | Yunick . | |

FOREIGN PATENT DOCUMENTS

210514 * 8/1989 (JP) ...................................... 405/215

OTHER PUBLICATIONS

Svedala Brochure, Trellex Fender Systems (30 pages) (Undated).
Svedala Brochure, Trellex Application Manual (30 pages) (Undated).

* cited by examiner

*Primary Examiner*—David Bagnell
*Assistant Examiner*—Frederick L. Lagman
(74) *Attorney, Agent, or Firm*—Foley & Lardner

(57) ABSTRACT

The lock and dam system for waterway includes a dam extending across the waterway, the channel having a first entry-exit opening on a first side of the dam and a second entry-exit opening on the second side of the dam. The channel includes a lock. The system further includes a fascia approximate first entry-exit opening in the channel, and a fender system to protect the fascia from impact with objects generally moving in a first direction. The system includes a first panel, a second panel, a first support element coupled to one of the first and second panels and coupled to the at least one fascia and a second support element coupled to one of the first and second panels and coupled to the at least one fascia. The first support element extends oblique to said one of the first and second support panels with the second support element extends oblique to said one of the first and second panel. The first and second support elements consecutively extend along at least one of the first and second panels and extend parallel to one another.

20 Claims, 4 Drawing Sheets

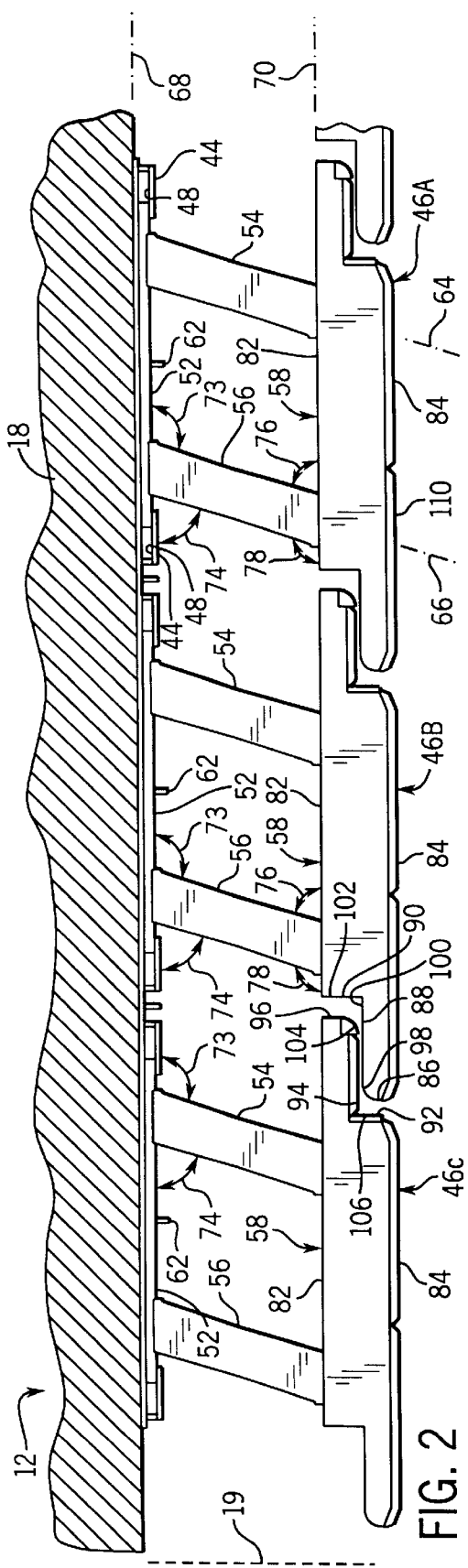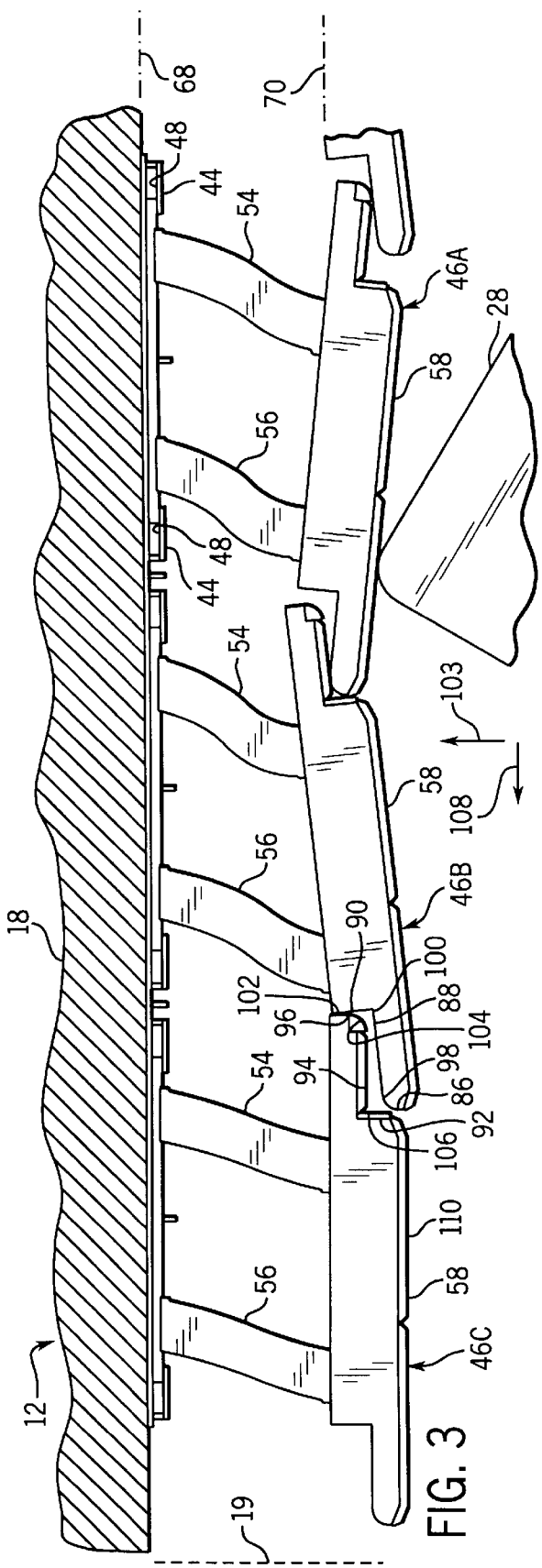

FENDER SYSTEM

FIELD OF THE INVENTION

The present invention relates to bumper or fender systems for protecting walls or fascias during collisions with moving objects. In particular, the present invention relates to an array of overlapping panels and a system for supporting such panels adjacent to the fascia.

BACKGROUND

Bumper or fender systems are commonly used to protect rails and walls, also known as fascias, in a variety of land and marine applications. In such applications, the fender systems protect the fascias during a collision and impact with moving objects. Such fender systems are commonly employed to protect fascias, such as approach walls, along marine locks from the accidental impact of tows and barges as the tows line up to enter the locks. Current construction typically utilizes an in situ massive, monolithic concrete construction to resist such impact. Unfortunately, although providing a continuous contact surface, such monolithic concrete construction is extremely expensive and difficult to construct and repair. Proposed newer construction utilizes factory-built, lightweight, pre-stressed concrete construction. Such prestressed concrete construction is unable to withstand all ranges of incidental barge contact.

To avoid the high cost associated with monolithic concrete structures, locks can utilize side-by-side contact panels mounted in front of the wall or fascia by pairs of opposing energy-absorbing elements. To provide a "continuous" contact surface, the contact panels are normally hinged together. Although such systems satisfactorily protect the approach wall or fascia, such fender systems have several associated drawbacks. First, because the panels are hinged together, the contact panels are more difficult to install, are more subject to damage, and are more difficult to repair and replace. Second, the pair of opposing energy-absorbing elements mounted between the fascia and the contact panels provide a very abrupt retardation effect during impact with moving barges. This abrupt retardation effect transmits a large percentage of the forces into the approach wall or fascia. Thus, such fender systems require a more substantial approach wall or fascia to absorb such large forces. As a result, the more substantial approach wall required by such fender systems increases the costs associated with such fender systems.

Thus, there is a continuing need for a marine fender system for protecting approach walls or fascias of a lock that is capable of withstanding all ranges of incidental barge contacts while being lightweight, inexpensive, easy to install, repair and replace, and less susceptible to damage.

SUMMARY OF THE INVENTION

The present invention provides a fender system for use with at least one fascia to protect the at least one fascia during collision with at least one moving object. The fender system includes a first panel, a first support element coupled to the first panel and adapted to be coupled to the at least one fascia, and a second support element. The first and second support elements extend oblique to the first panel and extend parallel to one another.

The present invention also provides a fender system for use with at least one fascia to protect the at least one fascia from impact with objects generally moving in a first direction. The system includes a first panel, a second panel, a first support element coupled to one of the first and second panels and adapted to be coupled to the at least one fascia and a second support element coupled to one of the first and second panels and adapted to be coupled to the at least one fascia. The first support element extends oblique to said one of the first and second panels. The second support element extends oblique to said one of the first and second support panels. The first and second support elements consecutively extend along at least one of the first and second panels and extend parallel to one another.

The present invention provides the lock and dam system for waterway which includes a dam extending across the waterway, a channel having a first entry-exit opening on a first side of the dam and a second entry-exit opening on the second side of the dam. The channel includes a lock. The system further includes a fascia proximate first entry-exit opening of the channel and a fender system to protect the fascia from impact with objects generally moving in a first direction. The system includes a first panel, a second panel, a first support element coupled to one of the first and second panels and coupled to the at least one fascia and a second support element coupled to one of the first and second panels and coupled to the at least one fascia. The first support element extends oblique to said one of the first and second support panels while the second support element extends oblique to said one of the first and second panel. The first and second support elements consecutively extend along at least one of the first and second panels and extend parallel to one another.

BRIEF DESCRIPTION OF THE DRAWINGS

FIG. 2 is a top sectional view of the fender system of FIG. 1 in a relaxed state.

FIG. 3 is a top sectional view of the fender system of FIG. 2 in an energy-absorbing state while a fender cartridge is being engaged by a floating vessel.

DETAILED DESCRIPTION OF THE PREFERRED EMBODIMENT

Figure 1:
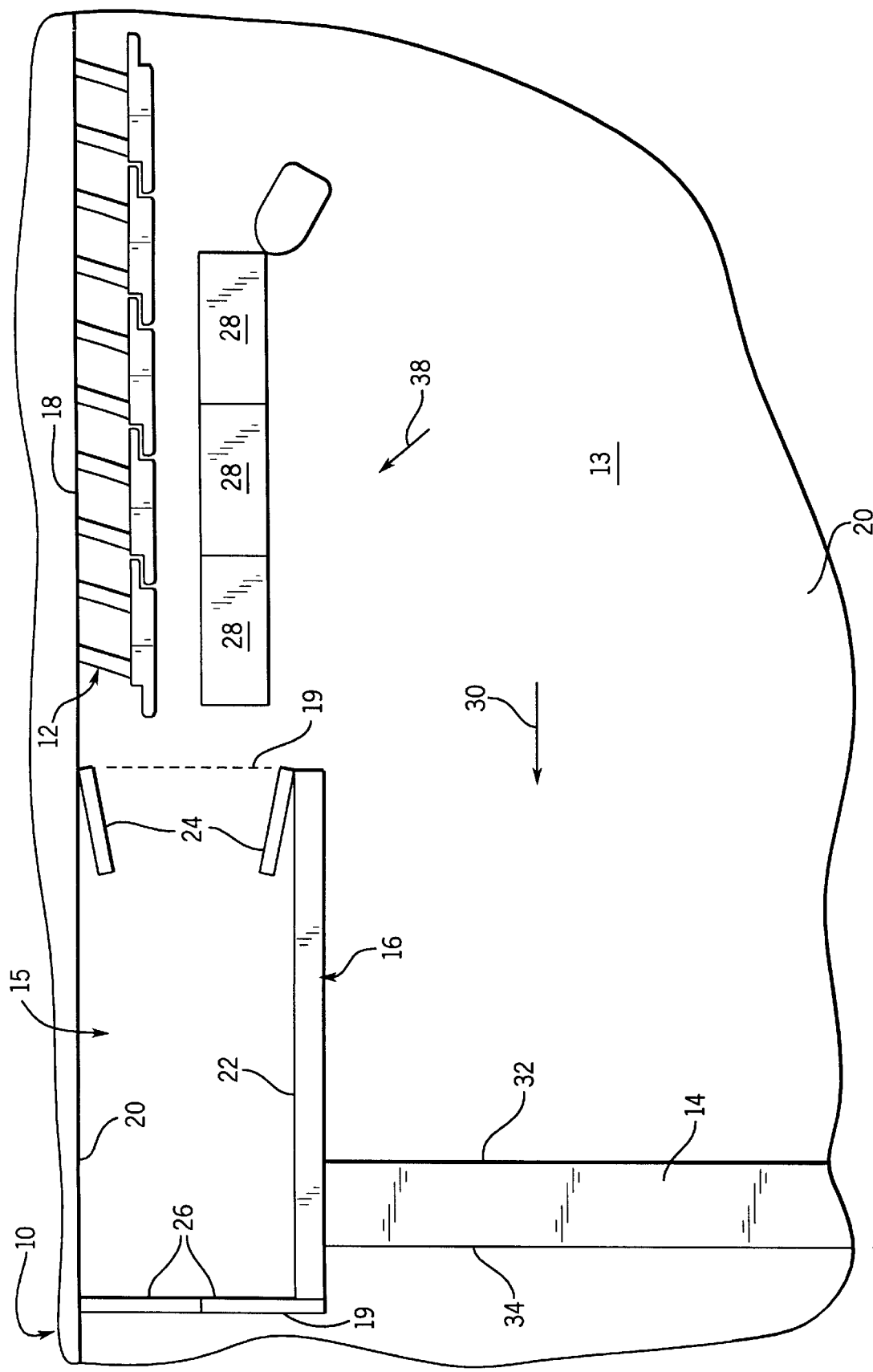
FIG. 1 is a top elevational view schematically illustrating a lock and dam system including a fender system in and along a waterway.

FIG. 1 is a top elevational view schematically illustrating a lock and dam system 10 including fender system 12 in and along a waterway 13. Lock and dam system 10 generally includes dam 14, channel 15 including at least one lock 16, and approach wall or fascia 18. Dam 14 extends substantially across waterway 13 to block the flow of water and to thereby raise the level of water on one side of dam 14. Channel 15 extends between the opposite sides of dam 14 and includes entrance-exit opening 19 on opposite sides of dam 14. Lock 16 forms part of channel 15 and generally includes outer walls 20, 22, gates 24, and gates 26. Lock 16 is generally sized to receive floating vessels such as ships, barges and the like, whereas the water level within the lock is raised or lowered to the height of the water level on one side of dam 14, depending upon the direction in which the floating vessel is traveling. Although entrance-exit opening 19 of channel 15 coincides with gates 24 and 26 of lock 16, channel 15 may alternatively include entrance-exit openings 19 which do not coincide with gates 24 and 26 and which merely comprise openings for channels leading to and from gates 24 and 26.

FIG. 1 illustrates a tow of barges 28 traveling in the direction indicated by arrow 30. Waterway 13, also known as a river, seaway or canal, has a higher water level on side 32 of dam 14 as compared to side 34 of dam 14. To pass barges 28 through lock 16, barges 28 are positioned within lock 16 between walls 20 and 22 and between gates 24 and 26 which are closed as water within lock 16 is drained out of lock 16 such that the water level within lock 16 is the same as the water level on side 34 of dam 14. Once the water level within lock 16 substantially equals the level of water on side 34 of dam 14, gates 26 are opened and barges 28 exit lock 16. This entire process occurs in a conventionally known manner.

Approach wall or fascia 18 extends along one or both sides of opening 19 and generally comprises a stationary wall formed from concrete or other durable material. To position barges 28 within lock 16, barges 28 must be aligned with entrance-exit opening 19 of channel 15 and lock 16. Alignment of barges 28 with entrance-exit opening 19 generally requires that barges 28 move towards approach wall or fascia 18 in the direction indicated by arrow 38. Fender system 12 protects fascia 18 during impact with barges 28. In addition, fender system 12 assists in directing barges 28 into alignment with entrance-exit opening 19.

Figure 3A:
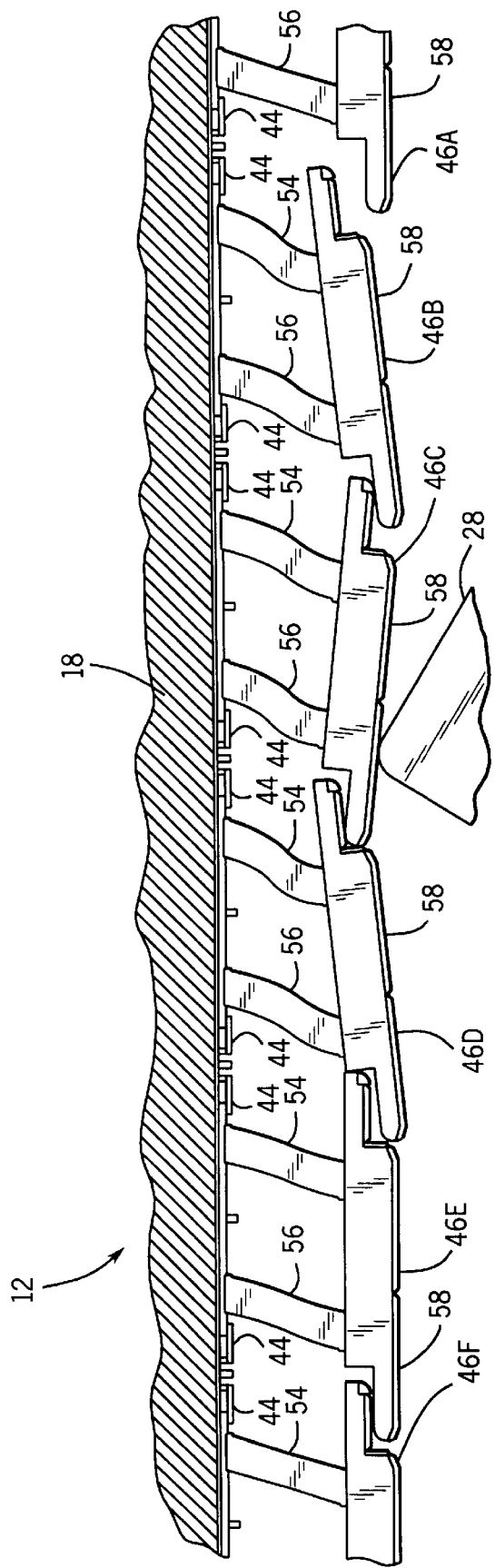
FIG. 3A is a top sectional view of the fender system of FIG. 3 in an energy-absorbing state after the floating vessel has moved past the fender cartridge.

FIGS. 2, 3 and 3A illustrate fender system 12 in greater detail. FIG. 2 illustrates fender system 12 in a relaxed state prior to being engaged by a floating vessel. FIG. 3 illustrates fender system 12 in an energy-absorbing state while cartridge 46A is being engaged by a floating vessel such as barge 28. FIG. 3A illustrates fender system 12 in an energy-absorbing state after barge 28 has moved past cartridge 46A. As shown by FIGS. 2 and 3, fender system 12 generally includes fascia mounts 44 and fender cartridges 46. Fascia mounts 44 are generally fixed to fascia 18 and form a channel 48 bounded on three sides. In the exemplary embodiment, channel 48 is bounded on a back side, a front side and a bottom side to enable fender cartridges 46 to be easily installed along fascia 18 by simply lowering fender cartridges 46 into channel 48. At the same time, each fender cartridge 46 may be easily lifted from channel 48 for repair or replacement.

Fender cartridges 46A, 46B and 46C are each removably coupled to fascia 18 by fascia mounts 44 and adjacent to one another along a front side of fascia 18. Fender cartridges 46A, 46B and 46C each generally include fender mounting portion 52, energy-absorbing support elements 54, 56 and contact panel 58. Fender mounting portions 52 are configured to slidably fit within channel 48 of fascia mounts 44 to support fender cartridges 46A, 46B and 46C adjacent to fascia 18. In the exemplary embodiment illustrated, fender mounting portions 52 each include a projecting lifting lug 62 by which each of cartridges 46A, 46B and 46C may be engaged by deployment devices during installation or during removal of cartridges 46A, 46B or 46C from mounts 44.

Support elements 54 and 56 comprise energy-dissipating or energy-absorbing members extending between fender mounting portions 52 and contact panels 58. Each of support elements 54 and 56 obliquely extend relative to the adjacent mount surfaces of fascia 18 and obliquely extend relative to contact panel 58. In particular, support elements 54 and 56 have center lines 64 and 66, respectively, which obliquely extend relative to plane 68, defined by the frontwardmost surface of fascia 18 most proximate to each of support elements 54 and 56, and to plane 70, defined by rear surface 82 of contact panel 58 most proximate to support elements 54 and 56. Each of support elements 54 and 56 obliquely extend relative to fascia 18 and contact panel 58 so as to form an obtuse angle 73 adjacent to fascia 18 facing or directed away from entrance-exit opening 19 and an acute angle 74 adjacent to fascia 18 facing or directed towards entrance-exit opening 19. Because planes 68 and 70 are parallel and because fascia 18 and contact panel 58 preferably extend parallel to one another, support elements 54 and 56 likewise form acute angles 76 adjacent to contact panel 58 facing away from entrance-exit opening 19 and obtuse angle 78 adjacent to contact panel 58 facing towards entrance-exit opening 19. In the exemplary embodiment, angles 74 and 76 are approximately 73 degrees. Support elements 54 and 56 preferably extend substantially parallel to one another between fascia 18 and contact panel 58. In the exemplary embodiment, support elements 54 and 56 are formed from a resiliently flexible material such as rubber. Support elements 54 and 56 support contact panel 58 while absorbing and dissipating energy from a floating vessel's impaction upon contact panels 58.

Contact panels 58 are generally rigid panels supported in front of fascia 18 by support elements 54 and 56. Contact panels 58 each generally include a rear surface 82, front surface 84, first end surfaces 86, 88, 90, and second end surfaces 92, 94 and 96. Surface 86 extends non-parallel relative to front surface 84 while surface 88 extends non-parallel relative to surface 86. Surface 90 extends non-parallel relative to surface 88. Surfaces 86 and 88 form a first step 98 while surfaces 88 and 90 form a shoulder 100 therebetween. In the exemplary embodiment, surfaces 86 and 90 extend generally parallel to one another and perpendicular to front surface 84 and surface 88. Alternatively, surfaces 86 and 90 extend relative to surfaces 84 and 88 at various other non-parallel angles. Furthermore, although the junction between surfaces 84 and 86 and between surfaces 86 and 88 are illustrated as being substantially rounded off and although surfaces 86 and 88 are illustrated as extending directly from one another, each of the various surfaces may be joined by additional intermediate surfaces such as chamfers and may have corners while still providing step 98 and shoulder 100. As described in greater detail hereafter with respect to FIG. 3, step 98 and shoulder 100 are formed by first end surfaces 86, 88, 90 to cooperate with the second end surfaces 92, 94 and 96 of adjacent contact panel 58 to transmit force therebetween.

Second end surface 92 extends non-parallel relative to front surface 84. Surface 94 extends non-parallel relative to surface 92. Surface 96 extends non-parallel relative to surface 94 and non-parallel relative to rear surface 82. Surfaces 94 and 96 form a step 104. Surfaces 94 and 92 extend non-parallel to one another to form a shoulder 106 therebetween. As best shown by FIGS. 1 and 2, surface 92 faces surface 86, surface 94 faces surface 88 and surface 96 faces surface 90 such that adjacent contact panels 58 overlap one another in directions both parallel to planes 68 and 70 and perpendicular to planes 68 and 70. In particular, each shoulder 100 receives an adjacent step 104 while each shoulder 106 receives an adjacent step 98. This overlapping enables fender system 12 to provide a continuous fender along the front of fascia 18 having a substantially contiguous front. Although surfaces 86 and 92 are illustrated as generally flat linear surfaces although surfaces 88 and 94 are illustrated as generally flat linear surfaces, such surfaces may alternatively be complementarily curved with various other surface configurations.

As best shown by FIGS. 3 and 3A, although a floating vessel, such as barge 28, may only directly impact a single contact panel 58 of a single fender cartridge 46, the forces of such impact are absorbed and dissipated by multiple fender cartridges 46. In particular, FIG. 3 illustrates barge 28 impacting upon contact panel 58 of fender cartridge 46A. During impaction, barge 28 exerts forces against contact panel 58 of fender cartridge 46A in the direction indicated by arrows 103 and 108. Because support elements 54 and 56 are formed from a resiliently flexible material, such as rubber, and because support element 54 and 56 are slanted towards entrance-exit opening 19, elements 54 and 56 flex towards fascia 18 in response to those forces in the direction indicated by arrow 103 and toward opening 19 in response to those forces in the direction indicated by arrow 108. Flexing of elements 54 and 56 causes contact panel 58 of fender cartridge 46A to move towards entrance-exit opening 19 into engagement with contact panel 58 of fender cartridge 46B. In particular, surface 86 engages surface 92 and surface 90 engages surface 96 in response to those forces occurring in the direction indicated by arrow 108. Surface 88 engages surface 94 in response to those forces occurring in the direction indicated by 102. Similar to support elements 54 and 56 of fender cartridge 46A, elements 54 and 56 of fender cartridge 46B absorb and dissipate energy while flexing contact panel 58 of fender cartridge 46B into engagement with contact panel 58 of fender cartridge 46C, whereby support elements 54 and 56 of fender cartridge 46C also absorb and dissipate energy while flexing towards entrance-exit opening 19. Thus, impaction forces from barge 28 are absorbed and dissipated by the fender cartridge directly impacted by barge 28 as well as each of the successive fender cartridges 46 extending towards entrance-exit opening 19 until such forces have been dissipated by elements 46. In effect, fender system 12 acts as a single continuous energy-absorbing wall to protect fascia 18. At the same time, each of fender cartridges 46A, 46B and 46C comprise distinct units which may be independently installed, independently removed and independently repaired.

Furthermore, because each of the contact panels 58 of fender cartridges 46A, 46B and 46C move, and preferably flex, in a single direction entrance-exit opening 19, fender cartridges 46A, 46B and 46C form a wall which rolls or pivots towards entrance-exit opening 19 to facilitate alignment of barge 28 with entrance-exit opening 19. Upon impaction, fender cartridges 46 form a "wave" which rolls towards entrance-exit opening 19. In addition, because elements 54 and 56 are angled or slanted towards opening 19, elements 54 and 56 have more compliance in the toward-lock direction (in the direction indicated by arrow 108), thereby enabling elements 54 and 56 to provide greater cushioning effect. Because elements 54 and 56 extend parallel to one another, contact panels 58 deflect substantially parallel to approach wall or fascia 18 and to each other so as to remain properly overlapped or interleaved as panels 58 are deflected by contact with barge 28. As further shown by FIG. 3A, once barge 28 has moved closer to entrance-exit opening 19 past a particular fender cartridge (such as fender cartridge 46A shown in FIG. 3A), the particular fender cartridge resiliently returns to its initial starting position prior to engagement with barge 28.

As further shown by FIGS. 2 and 3, to further facilitate the alignment of barge 28 with entrance-exit opening 19, each contact panel 58 includes a layer 110 of low friction material. Layer 110 preferably comprises a low friction material which is also abrasion resistant and gouge resistant. Layer 110 preferably comprises 1.5 inch thick layer of ultra-high molecular weight polyethylene. Layer 110 is preferably bolted to the remainder of panel 58. As will be appreciated, layer 110 may be formed from a variety of different low friction materials, may have a variety of thicknesses depending upon the type of material forming layer 110 and the expected use of layer 110 and may be secured to the remainder of contact panel 58 by various other mechanical fastening methods, adhesives or co-molding processes. In the exemplary embodiment, layer 110 also extends along surfaces 92 and 94 to protect those surfaces from abrasion and to facilitate relative movement between surfaces 92, 94 and opposing surfaces 86, 88. This further facilitates faster overlapping and transmission of forces between adjacent contact panels 58 and facilitates faster return of fender cartridges 46 to their at-rest positions shown in FIG. 2.

Figure 4:
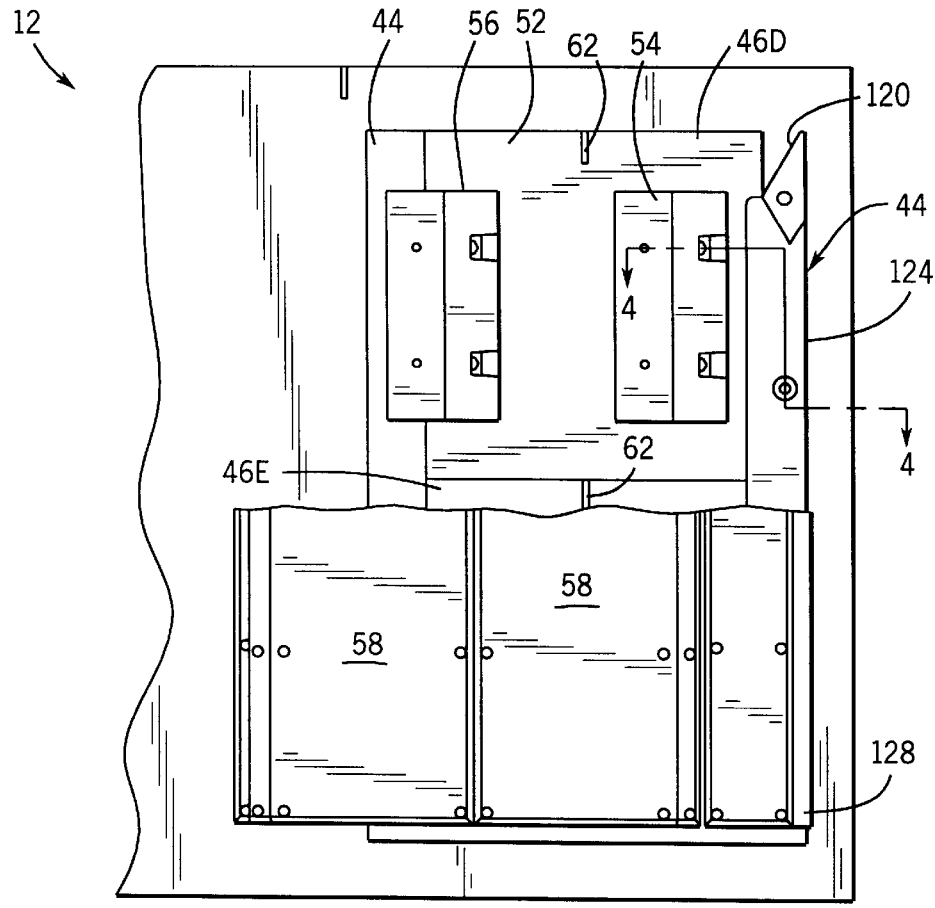
FIG. 4 is a fragmentary front elevational view of an end portion of the fender system of FIG. 1 with portions broken away for purposes of illustration.
Figure 5:
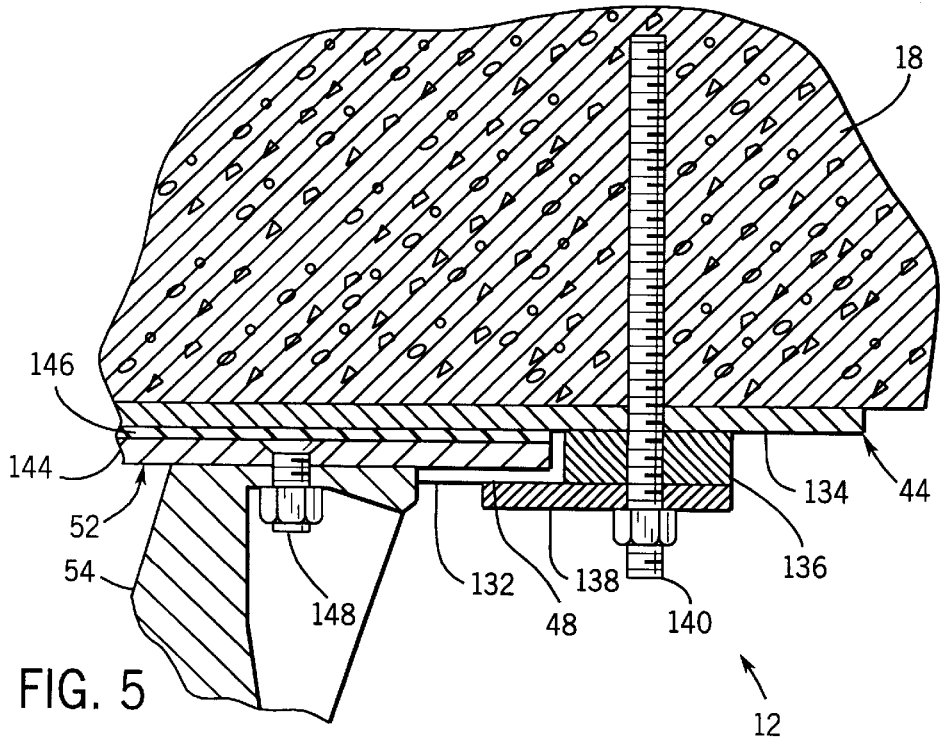
FIG. 5 is a fragmentary sectional view of the fender system of FIG. 4 taken along line 5—5.

FIGS. 4 and 5 illustrate, in greater detail, fascia mounts 44 supporting fender cartridges 46D and 46E along fascia 18. FIG. 4 is a fragmentary front elevational view of fender cartridges 46D and 46E with portions contact panels 58 broken away for purposes of illustration. FIG. 5 is a fragmentary sectional view taken along line 5—5 of FIG. 4. As best shown by FIG. 4, each fascia mount 44 supports two vertically stacked fender cartridges 46.

FIG. 4 illustrates an end portion of fender system 12. As shown by FIG. 4, fascia mounts 44 extend along a substantial portion of the front of fascia 18 so as to support a sufficient number of fender cartridges 46 in front of fascia 18 to adequately protect fascia 18. In the exemplary embodiment, each of fascia mounts 44 supports two vertically stacked fender cartridges 46D, 46E. For ease of illustration, FIG. 4 illustrates only a single fascia mount 44 along its length. As will be appreciated, fascia 18 would normally be provided with a multitude of fascia mounts 44 and a multitude of fender cartridges 46 along its length leading up to entrance-exit opening 19 of channel 15 (shown in FIG. 1). Fender cartridges 46D and 46E are each substantially identical to fender cartridges 46A–46C described with respect to FIGS. 1 and 2. As shown in FIG. 4, fender cartridge 46E is secured to a front of fascia 18 by inserting fender mounting portion 52 within channel 48 defined by fascia mount 44. As noted above, fender mounting portion 52 rests upon a bottom surface provided by fascia mount 44. Fender cartridge 46D is mounted to fascia 18 by inserting fender mounting portion 52 into channel 48 defined by fascia mount 44 in the same manner. Fender cartridge 46D rests upon the upper edge of fender mounting portion 52 of fender cartridge 46E while being retained against the front of fascia 18 by fascia mount 44. To facilitate the insertion of fender cartridges 46D and 46E into channel 48, fascia mount 44 preferably includes a beveled guide 120 at its upper end. Guide 120 preferably extends at an angle of approximately 60 degrees. Although fender system 12 is illustrated as including a plurality of stacked fender cartridges 46D, 46E in FIG. 4, fender system 12 may alternatively include single longer cartridges, wherein support elements 54, 56 support a single contact panel which is disposed within fascia mounts 44.

As shown by FIGS. 2 and 3, contact panels 58 of fender cartridges 46 partially overlap one another and extend in front of fascia mount 44. However, as shown by FIG. 4, end-most portions 124 of fascia mounts 44 are not generally covered by fender cartridges 46D, 46E. Accordingly, fender system 12 additionally includes end contact panels 128. End contact panels 128 are substantially identical contact panels 58 except that end contact panels 128 have a reduced length and include only one end that overlaps with contact panel 58 of an adjacent fender cartridge 46. The other end of contact panel 128 extends past fascia mount 44 and converges to fascia 18 so as to provide a ramp. Furthermore, in contrast to contact panel 58, end contact panels 128 are directly mounted to end-most portion 124 of fascia mount 44.

In lieu of contact panels 128, fender system 12 may have various other structures for protecting the front-most portion of fender system 12. For example, fender system 12 may alternatively be provided with an end-most fender support element 54 having a reduced height with respect to element 56 and an end-most contact panel 58 which has an increased length such that the end-most contact panel 58 supported by the shorter fender element 54 slants over end-most portion 124 of fascia mount 44 to fascia 18 to provide a resiliently flexible and movable ramp at the end of fender system 12. Alternatively, fender system 12 may omit such structures if deemed unnecessary.

FIG. 5 is a sectional view of FIG. 4 taken along lines 5—5. FIG. 5 illustrates fascia mount 44 and fender mounting portion 52 of fender cartridge 46D in greater detail. As shown by FIG. 5, fascia mount 44 generally includes bottom support 132, back support 134, side supports 136, front support 138, and fastener 140. Bottom support 132, back support 134, side supports 136 and front supports 138 form channel 48 which receives fender mounting portion 52. In particular, bottom support 132 forms the bottom of channel 48 upon which mounting portion 52 rests. Back support 134 and front support 138 extend opposite to one another to capture mounting portion 52 therebetween to retain fender cartridge 46D against fascia 18. Back support 134 additionally provides a mounting base to future protect fascia 18 from damage. Side supports 136 (only one of which is shown) extend opposite one another to capture mounting portion 52 therebetween to retain fender cartridge 46D in position along fascia 18. In the exemplary embodiment, bottom support 132, back support 134, side support 136 and front support 138 are comprised of steel panels preferably secured to one another by welding. As will be appreciated, supports 132, 134, 136 and 138 may alternatively be integrally formed as part of a single unitary body and may be formed from a variety of different materials. Fastener 140 preferably comprises a extending through supports 134, 136 and 138 to secure fascia mount 44 to fascia 18. Fascia mount 44 may alternatively be mounted to fascia 18 by a variety of alternative fastening structures and methods.

As further shown by FIG. 5, fender mounting portion 52 generally includes base 144 and pad 146. Base 144 comprises a rigid panel to which support elements 54 and 56 are secured by fasteners 148. As shown by FIG. 5, fasteners 148 preferably comprise flat head counter sunk bolts extending through base 144 and bolted to elements 54, 56. In the exemplary embodiment, base 144 is preferably formed from A36 galvanized steel.

Pad 146 comprises a sheet of energy-absorbing, resiliently compressible, impact-resistant material, such as rubber, overlaid and secured against base 144 opposite support elements 54, 56. Pad 146 provides a soft high friction intermediate layer between base 144 and back support 134 of fascia mount 44 to prevent abrasive wear of base 144 and back support 134. Pad 146 also transmits shear and compressive forces to back support 134 and ultimately fascia 18.

Overall, fender system 12 provides a means for protecting approach walls or fascias that is lightweight, inexpensive, easy to install, repair and replace, and less susceptible to damage. Because consecutive support elements 54, 56 extend parallel to one another, yet oblique to fascia 18, fender support elements 54, 56 absorb and dissipate energy upon impact while flexing a single direction towards the opening or entrance of the channel or lock to facilitate alignment of the floating vessel with the entrance of the channel or lock. Because contact panels 58 overlap one another, contact panels 58 engage one another and transmit force therebetween upon being impacted by a floating vessel such that the individual contact panels 58 and the individual fender cartridges 46 act as a single continuous energy-absorbing wall to protect fascia 18. At the same time, however, because each of fender cartridges 46 comprise distinct units which are removably supported against fascia 18 by fascia mounts 44, fender cartridge 46 may be independently installed, independently removed and independently repaired. Because each of contact panels 58 include overlapping steps and shoulders, contact panels 58 overlap one another, yet still provide a relatively smooth, generally contiguous front surface upon which floating vessels may impact.

Although fender system 12 is illustrated and described as including each of the above preferred features, various other configurations and embodiments of fender system 12 are contemplated herein within the scope of the disclosure. For example, in lieu of including fascia mounts 44 for releasably mounting fender cartridges 46 to fascia 18, fender cartridges 46 may alternatively be permanently secured to fascia 18 by more permanent fasteners or by embedment into fascia 18. In lieu of having overlapping contact panels 58, fender system 12 may alternatively include side-by-side, non-overlapping contact panels. In lieu of having overlapping steps and shoulders, contact panels 58 may alternatively overlap one another in other fashions whereby a relatively smooth contiguous front surface may or may not be provided. In lieu of having parallel support elements 54, 56 which extend oblique to fascia 18, fender system 12 may utilize other arrangements of support elements 54, 56. Each of the above-described alternatives are contemplated but are not described since such alternatives are not presently preferred. The combination of the above-noted features provides synergistic benefits and best protects fascia 18 during impact with floating vessels.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A fender system for use with at least one fascia to protect the at least one fascia during collision with at least one moving object, the system comprising:
   a first panel; and
   a Plurality of support elements including:
      a first support element coupled to the first panel and adapted to be coupled to the at least one fascia, the first support element extending oblique to the first panel; and
      a second support element extending oblique to the first panel, wherein the first and second support elements extend parallel to one another and wherein the plurality of support elements are configured to flex in response to a force applied to a midpoint of the first panel in a first direction perpendicular to the first panel so as to cause the first panel to move nonparallel to the direction of force.

2. The system of claim 1 wherein the at least one object is generally moving in a first direction and wherein the first and second support elements angularly extend from the first panel so as to form an acute angle with the first panel towards the first direction and an opposite obtuse angle.

3. The system of claim 2 wherein the first and second support elements are configured to resiliently flex in the first direction.

4. The system of claim 3 wherein the first and second support elements are configured to resiliently flex in a second direction non-parallel to the first direction.

5. The system of claim 1 wherein the first and second support elements are directly coupled to the first panel.

6. The system of claim 1 wherein the first and second support elements consecutively extend along the first panel.

7. The system of claim 1 including:
a second panel;
a third support element coupled to the second panel and adapted to be coupled to the at least one fascia, the third support element extending oblique to the second panel; and
a fourth support element coupled to the second panel and adapted to be coupled to the at least one fascia, the fourth support element extending oblique to the second panel, wherein the third and fourth support elements extend parallel to one another.

8. The system of claim 7 wherein the second and third support elements extend substantially parallel to one another.

9. The system of claim 8 wherein at least one of the first and second panels is adapted to be movably supported relative to the at least one fascia.

10. The system of claim 1 wherein the first and second support elements are each formed from a resiliently flexible material.

11. The system of claim 10 wherein the first and second support elements are formed from a rubber material.

12. A fender system for use with at least one fascia to protect the at least one fascia from impact with objects generally moving in a first direction, the system comprising:
a first panel;
a second panel; and
a plurality of support elements including every support element coupled to the first panel and the second panel, the plurality of support elements including:
a first support element coupled to one of the first and second panels and adapted to be coupled to the at least one fascia, the first support element extending oblique to said one of the first and second panels; and
a second support element coupled to one of the first and second panels and adapted to be coupled to the at least one fascia, the second support element extending oblique to said one of the first and second panels, wherein the first and second support elements consecutively extend along at least one of the first and second panels and wherein the at least a majority of the plurality of support elements extend parallel to one another.

13. A lock and dam system for a waterway, the lock and dam system comprising:
a dam extending across the waterway;
a channel having a first entry-exit opening on a first side of the dam and a second entry-exit opening on a second side of the dam, the channel including a lock;
a fascia approximate the first entry-exit opening of the channel; and
a fender system to protect the fascia from impact with objects generally moving in a first direction, the system comprising:
a first panel;
a second panel;
a first support element coupled to one of the first and second panels and coupled to the at least one fascia, the first support element extending oblique to said one of the first and second panels; and
a second support element coupled to one of the first and second panels and coupled to the at least one fascia, the second support element extending oblique to said one of the first and second panels, wherein the first and second support elements consecutively extend along at least one of the first and second panels, wherein the first and second support elements extend parallel to one another and wherein the first and second support elements and the first and second panels are configured to more easily move in the first direction as compared to a second opposite direction.

14. The system of claim 13 wherein the first and second support elements angularly extend from the first panel so as to form an acute angle with the first panel directed away from the first opening and an obtuse angle, with the first panel directed towards the first opening.

15. The system of claim 13 wherein the first and second support elements are configured to resiliently flex in the first direction.

16. The system of claim 13 wherein the first and second support elements are configured to resiliently flex in a second direction non-parallel to the first direction.

17. The system of claim 13 wherein the first and second support elements are directly coupled to the first panel.

18. The system of claim 13 wherein the first and second support elements consecutively extend along the first panel.

19. The system of claim 13 wherein the first and second support elements are each formed from a resiliently flexible material.

20. The system of claim 13 wherein at least one of the first and second panels is adapted to be movably supported relative to the fascia.

* * * * *